April 17, 1956     L. D. VAN ANTWERPEN     2,742,219

ACCORDION PLEATED CUSHIONING STRIP

Filed Oct. 15, 1953

INVENTOR
LLOYD D. VAN ANTWERPEN

BY

ATTORNEYS

United States Patent Office 2,742,219
Patented Apr. 17, 1956

2,742,219

ACCORDION PLEATED CUSHIONING STRIP

Lloyd D. Van Antwerpen, Milwaukee, Wis.

Application October 15, 1953, Serial No. 386,274

3 Claims. (Cl. 229—14)

This invention appertains to the packaging, carrying and shipping of fragile articles, such as display signs, window glass, mirrors and the like, and more particularly to a shock absorbing filler for the bottom of a shipping or carrying case or carton.

One of the primary objects of this invention is to provide a shock absorbing filler upon which the bottom of a fragile article rests, embodying an accordion pleated resilient supporting member, with means for holding said member in its assembled condition and for limiting the upward movement of the resilient member beyond a certain point for guiding the member during the expansion and contraction thereof.

Another salient object of this invention is the provision of a shock absorbing filler embodying an accordion pleated supporting member so folded as to normally exert an upward thrust, with end caps receiving the terminals of the member for holding the filler in its assembled position, the supporting member being intially compressible upon sudden downward thrust of the article being carried with the end caps functioning as stops for limiting the continued downward movement of the article against the bottom of the carton or case.

A further important object of my invention is to provide a resilient shock absorbing filler for use in conjunction with a carrying case or shipping carton and packaging strips of the type and character shown in the Van Antwerpen Patent No. 2,603,349, issued July 15, 1952.

A still further important object of my invention is to provide a resilient shock absorbing filler which will not mash down under the weight of an object being supported in a container irrespective of the length of time the article may be resting on said filler.

With these and other objects in view, the invention consists in the novel construction, arrangement and formation of parts as will be hereinafter more specifically described and claimed, and illustrated in the accompanying drawing, in which drawing:

Figure 2 is a perspective view of the resilient and shock absorbing filler looking down toward the bottom thereof;

Figure 3 is a view similar to Figure 2, but showing the filler in its partially assembled position;

Figure 4 is a perspective view of the filler looking toward the top thereof, and Figure 5 is a transverse sectional view through the filler taken on the line 5—5 of Figure 4, looking in the direction of the arrows.

Figure 1:
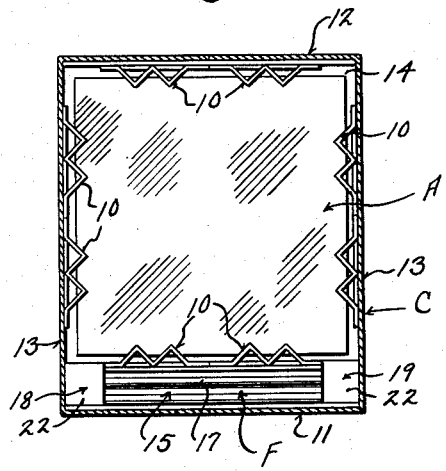
Figure 1 is a side elevational view of the resilient shock absorbing filler showing the same in a shipping carton or case and supporting a fragile article, the carton or case being shown in section.
Figure 1:
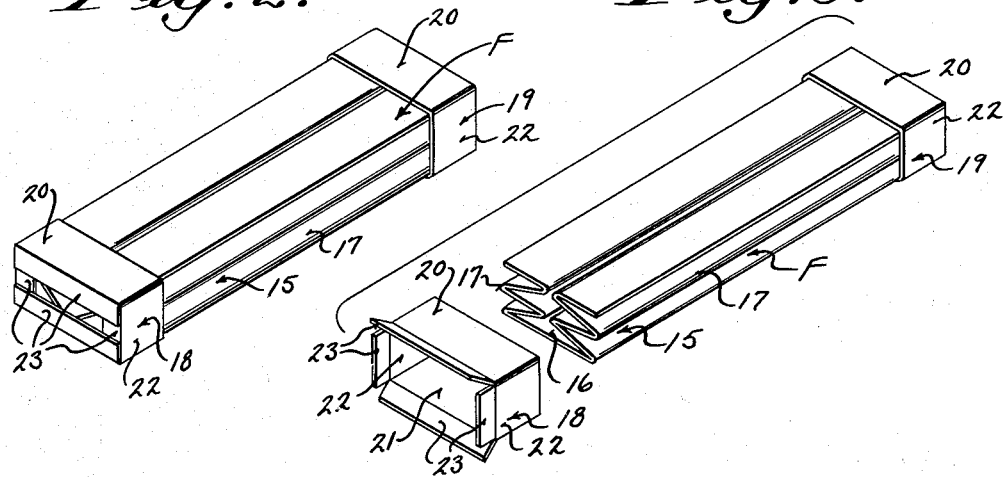
Figure 1:
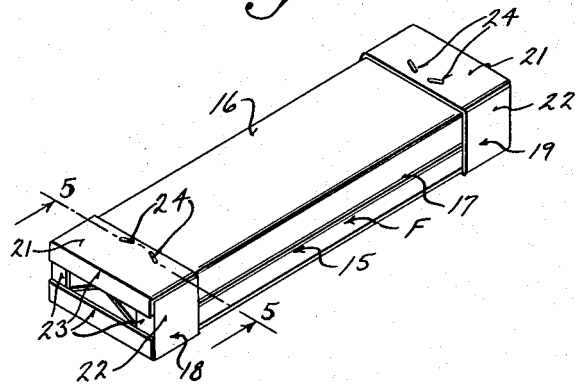

Referring to the drawing in detail, wherein similar reference characters designate corresponding parts throughout the several views, the letter F generally indicates my improved filler which forms the subject matter of this present invention and the filler is adapted to be placed in the bottom of a carton or carrying case C for resiliently supporting a fragile article A. The article A may be a display sign, mirror, window glass or the like, and the edges thereof can be protected in the carton or case by packaging, cushioning strips 10, and these strips can be of the type and character shown in the patent mentioned.

The carton or case C forms no part of the present invention, but includes a bottom wall 11, a top wall 12, end walls 13 and side walls 14. Where the carton is used as a carrying case, the top wall 12 can be provided with carrying handles.

The filler F is utilized, more particularly to absorb undue shocks, where the case or carton is laid abruptly down on the bottom wall 11. The filler F includes the resilient and shock absorbing member 15, which is preferably formed from a single sheet of corrugated board or other desired material, and the sheet is so folded as to form a compressible and resilient member. Thus, the sheet is folded to provide a connecting top wall 16 and longitudinally extending spaced side walls 17, and these side walls are accordion pleated so as to give the same the desired resiliency.

In order to limit the upward expansion of the side walls 17 and to guide these side walls during expansion and compression thereof and to prevent the side walls from being mashed flat, when a heavy sign or other article rests thereon for a considerable length of time, I provide end caps 18 and 19 for the terminals of the member 15. These end caps can also be formed from corrugated board, if such should be desired. Each of the caps 18 and 19 includes like bottom and top walls 20 and 21 and end walls 22. In order to add strength the outer edges of the top, bottom and end walls can be provided with terminal flaps 23, which are folded inwardly and sealed with any desired type of adhesive. The end caps 18 and 19 are slid over the terminals of the member 15 with the side walls 17 thereof slightly compressed and the top wall 16 of the member 15 is secured to the top walls 21 of the end caps by any preferred means, such as staples 24 (see Figures 4 and 5). Hence, the the side walls 17 are free from the end walls of the top walls of the end caps. It is to be noted that the staples are centrally located, so that the top walls can bend down from the end walls 22.

In use of my resilient shock absorbing member, the same is placed in the carton or carrying case C against the bottom wall thereof, after which the fragile article A is slipped into the carton from the top thereof, and as stated, the edges of the article can be provided with the packaging strips 10. In actual practice, the lower packaging strips 10 rest upon the upper surface of the top wall 16 between the end caps 18 and 19, so that the fragile article is supported by the resilient walls 17. When the package or article is placed upon the floor with undue force, the article tends to move toward the bottom wall 11 of the carton, and this downward movement is resisted by the side walls 17, and these side walls will absorb this thrust. The end caps guide the up and down movement of the side walls 17. If downward movement of the fragile article continues, then the corner edges of the article will contact the top walls 21 of the end caps, and these top walls will also tend to give with the article and gradually prevent further downward movement thereof.

The resilient and shock absorbing filler can be manufactured and placed upon the market at a reasonable cost, and can be quickly and easily associated with a shipping carton or carrying case.

Changes in details may be made without departing from the spirit or the scope of this invention, but what I claim as new is:

1. A resilient shock absorbing filler adapted to be placed in the bottom of a carton for supporting a fragile article comprising a longitudinally extending member having resilient and compressible side walls upon which the article rests, and reinforcing end caps completely encasing and receiving the terminals of the member for limiting the upward movement of the side walls of the member.

2. A shock absorbing filler adapted to be placed in the bottom of a carton for supporting a fragile article comprising a longitudinally extending member including a top wall and companion accordion pleated compressible side walls, end caps receiving the terminals of the member secured to the top wall of said member adjacent to its longitudinal center leaving the side walls of the member free for movement in the end caps, said end caps guiding the up and down movement of the side walls and limiting the upward movement thereof.

3. A shock absorbing filler, as defined in claim 2, and said end caps also including side walls and a top wall extending over the side walls of the member adjacent to the opposite ends thereof, and sealing end flaps on the outer edges of the bottom and top walls of the end caps.

References Cited in the file of this patent
UNITED STATES PATENTS

| | | |
|---|---|---|
| 987,958 | Clenny et al. | Mar. 28, 1911 |
| 1,817,286 | Beaman | Aug. 4, 1931 |
| 1,929,161 | Coffin et al. | Oct. 3, 1933 |